(12) United States Patent
Kobayashi et al.

(10) Patent No.: US 6,711,960 B2
(45) Date of Patent: Mar. 30, 2004

(54) COMPACT LOAD CELL WITH ARM TENSION ABSORPTION MEANS AND ARM REINFORCEMENT MEANS

(75) Inventors: Teruyoshi Kobayashi, Tokyo (JP); Yoshihito Fujii, Tokyo (JP); Yasumasa Takahashi, Hadano (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 10/159,165

(22) Filed: May 30, 2002

(65) Prior Publication Data

US 2002/0178841 A1 Dec. 5, 2002

(30) Foreign Application Priority Data

May 31, 2001 (JP) .......................... 2001-163841
Jun. 13, 2001 (JP) .......................... 2001-177964

(51) Int. Cl.⁷ ................................. G01L 1/22
(52) U.S. Cl. .................. 73/862.629; 73/862.632; 73/862.046
(58) Field of Search ............. 73/862.632, 862.629, 73/862.621, 862.046, 862.045, 862.044

(56) References Cited

U.S. PATENT DOCUMENTS 6,005,199 A * 12/1999 Harada et al. .............. 177/211
6,422,096 B1 * 7/2002 Bulat .................... 73/862.381

FOREIGN PATENT DOCUMENTS

JP          11-304606          5/1999

* cited by examiner

Primary Examiner—Edward Lefkowitz
Assistant Examiner—Andre Allen
(74) Attorney, Agent, or Firm—Christensen O'Connor Johnson Kindness PLLC

(57) ABSTRACT

In a small-sized, high precision load cell, an annular fixed section is arranged around a load application section, and the load application section and the fixed section are connected by a plurality of arms. The arms connected to the fixed section are not radial or straight, but are bent. Thus, a direction of extension n of a distortion vulnerable section at which a hole is formed is approximately perpendicular to a straight line m which connects the load application section and the distortion vulnerable section. Therefore, it is possible to prevent tension, which arises when a load is applied to the load application section, from being conveyed to the distortion vulnerable section and to detect only the distortion with a gauge.

16 Claims, 3 Drawing Sheets

COMPACT LOAD CELL WITH ARM TENSION ABSORPTION MEANS AND ARM REINFORCEMENT MEANS

BACKGROUND OF THE INVENTION

1. Field of the Invention

The present invention relates to a load cell, and more particularly to load cell of small size and high precision.

2. Description of the Related Art

A load cell which is constituted by providing a load application section at the center of the load cell, providing an annular fixed section around the load application section, connecting the load application section with the fixed section by means of arms, and forming holes in the arms so as to form a Roberval mechanism section has been known.

FIG. 3 shows an example of a conventional load cell. A load application section 1 to which a load is applied is provided at the center of the example load cell, an annular fixed section 2 (or a frame section) is formed around the load application section 1, and the load application section 1 and the fixed section 2 are connected by three pieces of three-way arms 3 of symmetry. A hole section 4 is formed at each of the arms 3. At the positions (a distortable section or a flexure section) of an upper surface and a lower surface of each arm 3 which correspond to the hole section, a pair of distortion gauges 5 (a total of four components: two on the upper surface and two on the lower surface) are installed.

With such constitution, when a load W is applied to the load application section 1, a distortion corresponding to the load W is produced in the distortable section, and the mass of the applied load W can be measured by measuring the distortion using the pair of gauges 5.

However, when the load W is applied to the load application section 1, in addition to the distortion corresponding to the load W which arises in the distortion vulnerable section, an error in output of the gauge 5 arises because of the influence of tension within the arms 3, thereby causing a problem such that it is often impossible to obtain measurements of the desired precision.

Further, because tension can permanently distort the distortable sections, there has been a problem such that it applications involving a heavy load have not been possible.

In order to solve such problems, for example, Japanese Patent No. 2962703 has proposed the constitution such that a flexure section is installed at an upper part of a fixed section in a direction which is perpendicular to a direction of extension of an arm, such that the flexure section absorbs tension.

FIG. 4 shows a load cell having such a constitution. An annular fixed section (a frame section) 13 is formed around a cylindrical load application section 12, and radial arms 14 are connected between the load application section 12 and the fixed section 13. One end of each of the arms 14 is directly connected with the load application section 12, and the other end of each of the arms 14 is connected via each of flexible sections 15 provided on the fixed section 13. Each of the flexible sections 15 is arranged on the fixed section 13 in such a manner that the flexible section 15 lies at a right angle to the arm 14, and each flexible section 15 and the fixed section 13 are united through lower parts of both ends of each flexible section 15.

A hole section 16 is formed in each of the arms 14, and a distortion gauge 17 is inserted into each of the upper and lower parts of the hole section 16.

By connecting the arms 14 to the fixed section 13 via the flexible sections 15 as described above, tension which is created when a load is applied is absorbed by deformation of the flexible sections 15 and the gauges 17 can detect just the distortion which arises due to the load.

However, in the constitution shown in FIG. 4, because the flexible section 15 is installed at an upper part of the fixed section 13 and the arm 14 is fixed to the flexible section 15, there has been a problem such that a height of the entire load cell increases.

Further, from a viewpoint of miniaturization of the load cell as a whole, it is necessary to shorten the radial arms 14 which extend from the load application section 12 and therefore there has been a problem such that it is difficult to improve the precision of such load cells.

SUMMARY OF THE INVENTION

The present invention is directed to provide a load cell which is low height, small, and highly precise.

According to one aspect, a load cell according to the present invention comprises a fixed section; a load application section to which a load is applied; an arm section for connecting the fixed section with the load application section and having a distortable section which deforms, when a load is applied to the load application section, according to the load; and a distortion detecting section for detecting distortion which arises in the distortion vulnerable section. Within such an arrangement in which a direction of extension of the distortion vulnerable section is at a specific angle with a straight line which connects the center of the load application section and the center of the distortion vulnerable section, it is possible to restrain tension created when a load is applied to the load application section from being conveyed to the distortion vulnerable section and to secure the linearity of the load and the distortion by controlling an error which may occur due to the tension. In the present invention, because it is not necessary to install a flexible section at an upper part of the fixed section, the height of the load cell can be reduced.

According to another aspect of the present invention, the distortion vulnerable section extends in such a manner that the distortion vulnerable section is substantially perpendicular to the straight line which connects the center of the load application section and the center of the distortion vulnerable section. The maximum restraint of the tension, which arises when a load is applied to the load application section, from being conveyed to the distortion vulnerable section is achieved when the direction of extension of the distortion vulnerable section is at right angles with the straight line which connects the center of the load application section and the center of the distortion vulnerable section.

Further, according to another aspect of the present invention, there is provided a pin to be inserted into a hole which extends through a side surface of the fixed section and substantially reaches the arm section or the load application section perpendicularly to a direction of applying a load. When the pin is inserted into the hole, shearing or failure of the arm section, which may occur when an overload is applied, is prevented. In other words, the pin functioning as a type of beam restrains the arm section in a direction of the application at the time of applying the load to less than a designated value. The maximum permissible flexure of the arm section is determined according to the diameter of the pin.

The present invention will more clearly be understood by referring to the following embodiments.

DESCRIPTION OF PREFERRED EMBODIMENTS

Preferred embodiments of the present invention will next be described with reference to the accompanying drawings.

Figure 1:
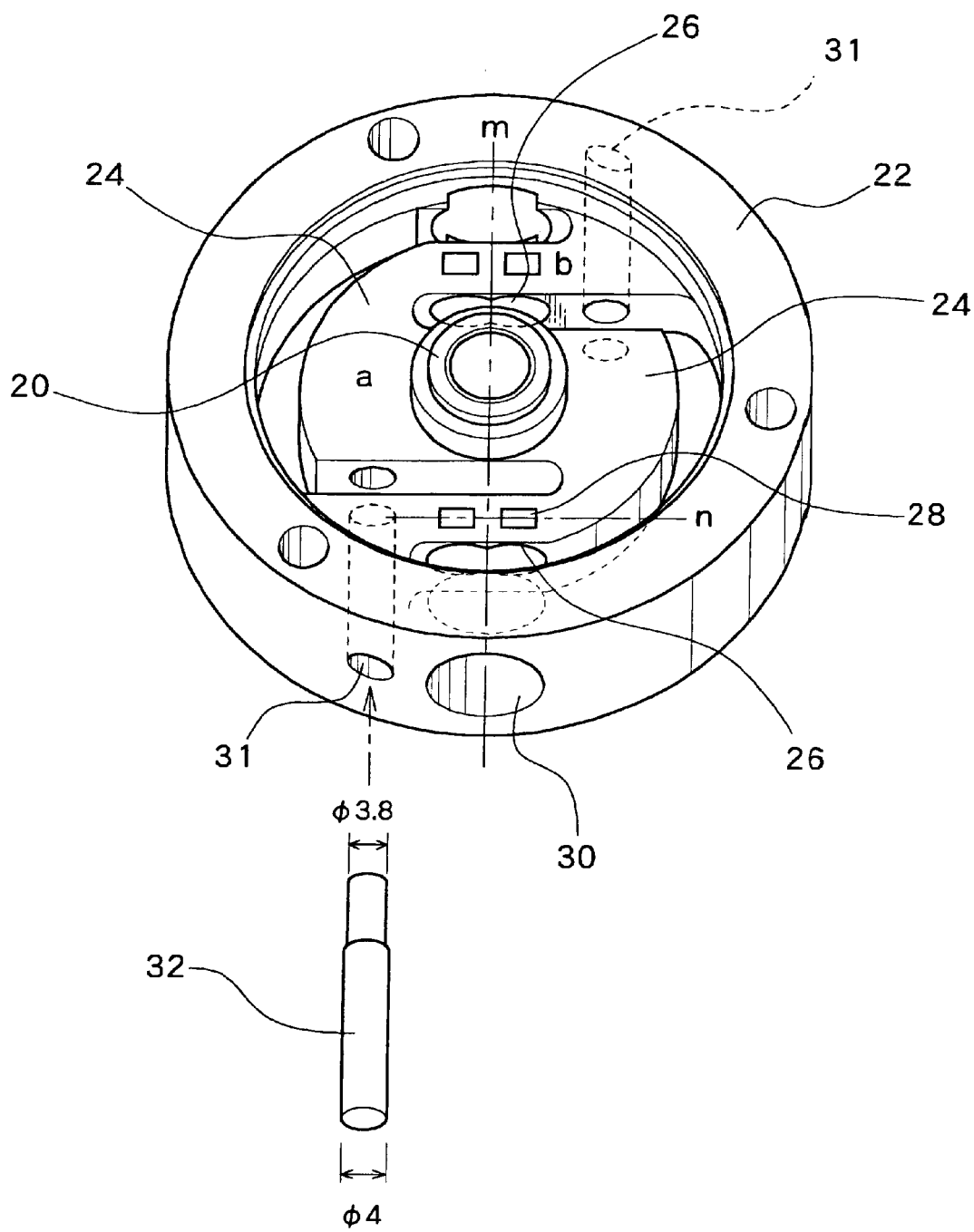
FIG. 1 is a perspective view of a load cell according to one embodiment of the present invention.

FIG. 1 is a perspective view of an example load cell according to a first preferred embodiment of the present invention. An annular fixed section 22 is arranged around a cylindrical load application section 20, and two arms 24 are connected between the load application section 20 and the fixed section 22. The two arms 24 are not connected to the fixed section 22 in a conventional manner such that the two arms 24 extend from the load application section 20 in a straight line, but rather are connected to the fixed section 22 in such a manner that the two arms 24 together form an S shape.

More specifically, each of the arms 24 is U-shaped, and one end of each arm 24 is connected to the load application section 20 while the other end is connected to the fixed section 22. The two arms 24 are connected to the load application section 20 and the fixed section 22 in such a manner that together they form an S, with the fixed section 22 being connected to both outer ends of the S, and the load application section 20 being connected to the center of the S shape. Two interconnecting holes 26 are provided at the arms 24, whereby a Roberval mechanism (a distortion vulnerable section) is constituted. Two distortion gauges 28 (four per arm 24) are provided at flexure sections, which are installed on an upper surface and a lower surface of each of the arms 24 and correspond to the holes 26, respectively.

Further, through the fixed section 22 and the arms 24 are provided holes 31. By inserting pins having a specified form into the hole 31, the displacement of the arms 24 when a load is applied can be regulated, thereby preventing the arms 24 from being broken.

More specifically, the holes 31 extend through a side surface of the fixed section 22, at approximately right angles with an angle of applying a load, and reach the arms 24. It is possible to provide a beam in a direction which is approximately perpendicular to the load application direction by inserting a pin 32 into the hole 31. The beam regulates the quantity of displacement (quantity of flexure) of the arms 24 at the time of applying the load. For example, in the example shown in FIG. 1, when the diameter of the holes 31 is 4 mm, the pin is composed of a section having a diameter of 4 mm and a section having a diameter of 3.8 mm, the section having a diameter of 4 mm is inserted into the fixed section 22, and the section having a diameter of 3.8 mm is inserted into the arm 24, it is possible to regulate the quantity of displacement of the arm 24 to 0.1 mm or less in each of the upward and downward directions within the variation of diameter of the pin.

As described above, because the arms 24 are bent and connect the load application section 20 and the fixed section 22, a direction of extension n of the distortion vulnerable section, more specifically a direction n of forming a pair of distortion gauges 28, forms an angle, a right angle in the example shown in the drawing, with a straight line m which connects the center of the load application section 20 and the center of the distortion vulnerable section. Thus, if the arm 24 is divided into section "a" which extends from the load application section 20 and section "b" which is connected to the fixed section, when a load is applied to the load application section 20, tension will be absorbed by rotation of the section a (rotation around the axis of the load application section 20), whereby the section b corresponding to the distortion vulnerable section will not be affected. Therefore, when the load is applied to the load application section 20, it is possible to detect the distortion corresponding to the load without being influenced by the tension using the distortion gauge 28.

Further, in the present embodiment, unlike in conventional load cells, because it is not necessary to install a flexible section on an upper surface of the fixed section 22 so as to absorb tension and the load application section 20 and the arms 24 can be formed in the annular fixed section 22, the height of the load cell can be kept low.

Further, in the present embodiment, because the distance between the distortion vulnerable section and the fixed section 22 facing the distortion vulnerable section is relatively short and line m is approximately perpendicular to line n, even in an example case wherein an opening section 30 is formed at the fixed section 22 and the hole 26 is made by cutting with a mill starting from the opening section 30, holes can be made using a mill with a short edge and a plurality of holes 26 can easily be formed. Generally, distortion detecting sensitivity of the Roberval mechanism depends on a length of the hole 26 formed at the arm 24 (a length of the arm 24 in a direction of the extension). Because the present embodiment simplifies formation of the plurality of holes 26, further improvement of the sensitivity of detecting distortion is enabled.

Figure 3:
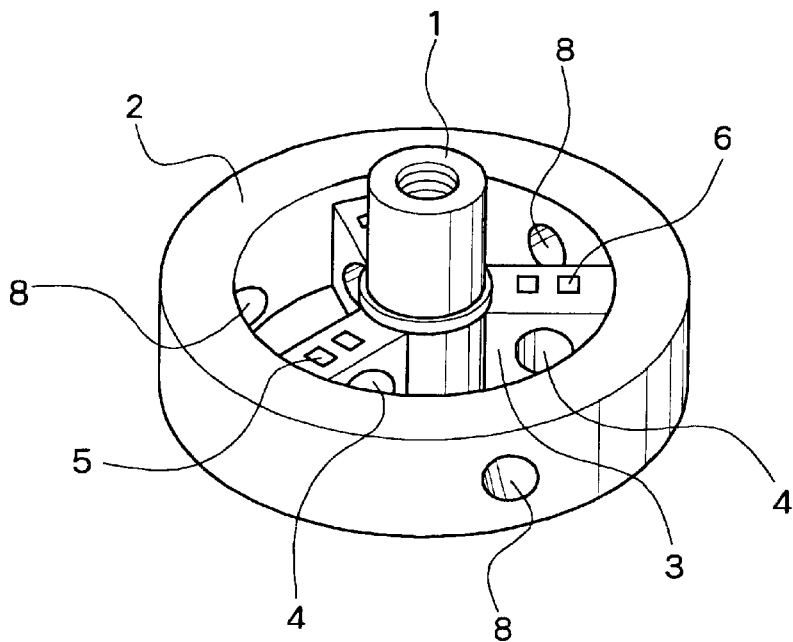
FIG. 3 is a perspective view of a conventional load cell.

It should also be noted that with the configuration of this embodiment, unlike the conventional load cell shown in FIG. 3, because the influence of the tension is controlled as described above, permanent distortion due to tension is prevented. Thus, the applicant of the present invention confirms that the maximum load can be approximately 1.5 times that of the conventional load cell compared with the load cell of FIG. 3.

Figure 2:
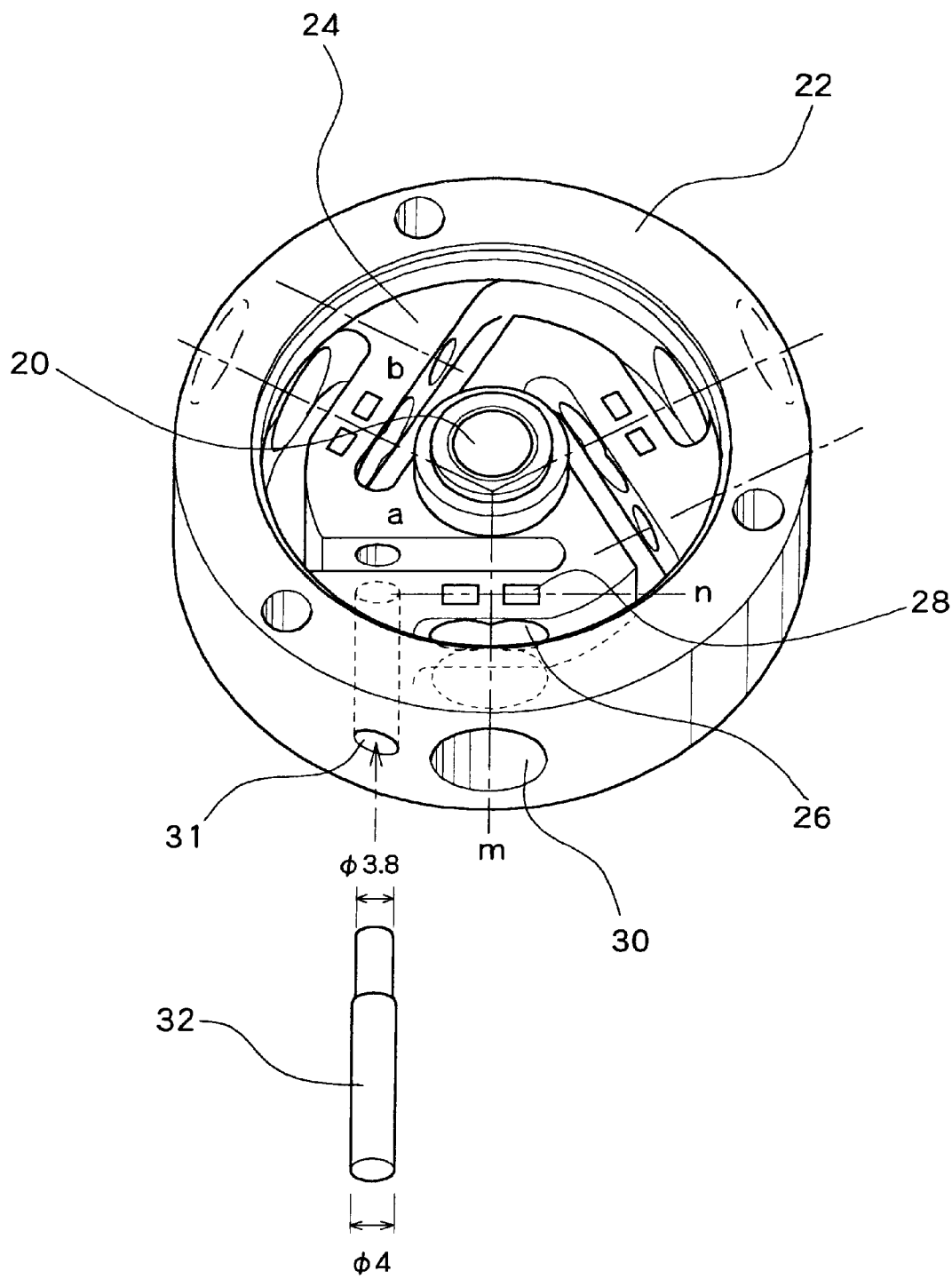
FIG. 2 is a perspective view of a load cell according to another embodiment of the present invention.

FIG. 2 is a perspective view of a load cell according to another embodiment of the present invention. In this embodiment, an annular fixed section 22 is arranged around a cylindrical load application section 20 and three arms or arm sections 24 are connected between the load application section 20 and the fixed section 22. Unlike the conventional load cells shown in FIG. 3 or FIG. 4, the three arms 24 connected to the fixed section 22 do not extend in a straight line from the load application section 20, but are each bent as shown in FIG. 2. More specifically, referring to the figure, one end of each arm 24 is connected to the fixed section 22 and the other end is connected to the load application section 20. The three arms 24 are connected to the load application section 20 and the fixed section 22 at respective three-way symmetry positions of the load application section 20. A hole 26 is formed in each arm 24, thereby constituting a distortion vulnerable section. Further, by inserting a pin 32 into a hole 31 which is formed at the fixed section 22 and the arm 24, quantity of displacement of the arm 24 when a load is applied can be restricted. Thus, also in this embodiment, line m which connects the center of the load application section 20 and the center of the distortion vulnerable section and the direction of extension n of the distortion vulnerable section are not colinear and are at angles to each other. In FIG. 2, the straight line m and the straight line n are at approximately right angles with each other. Therefore, when a load is applied to the load application section 20, tension is absorbed by rotating part "a" which extends from the load application section 20. The tension is not conveyed to part "b" which has the distortion vulnerable section and only distortion arises in the part b. The distortion can be detected by a distortion gauge 28.

Also in this embodiment, unlike in the conventional load cells, because it is not necessary to install a flexible section on an upper surface of the fixed section 22 so as to absorb tension and the load application section 20 and the arms 24 can be formed in the annular fixed section 22, the height of the load cell can be kept low.

Further, since a distance between the distortion vulnerable section and the fixed section 22 facing the distortion vulnerable section is relatively short and line m is approximately perpendicular to line n, a plurality of holes 26 can be easily formed using a mill with a short edge, even when an opening section 30 is formed at the fixed section 22 and the hole 26 is formed from the opening section 30.

Although illustrative preferred embodiments of the present invention are described above, the present invention is not restricted to the examples used to explain the embodiments and variations are possible. For example, although it was described that a hole 26 formed by interconnecting two holes is provided in the arm 24, it is also possible to form a single hole or three or more holes. Particularly, according to the present invention, because the distortion vulnerable section of the arm 24 faces the fixed section 22, formation of a greater number of holes than in the conventional art is simplified.

Further, although in the above embodiment the straight line m which connects the center of the load application section 20 and the center of the distortion vulnerable section is approximately at a right angles with the direction of extension n (direction of forming a pair of distortion gauges 28) of the distortion vulnerable section, the present invention is not restricted to such constitution and includes other configurations wherein line m and line n are not colinear. However, if angle formed by the intersection of the lines m and n is small, the influence of tension on the distortion vulnerable section will become significant. Therefore, to restrain the influence of the tension, it is preferable to have an angle of at least 45 degrees.

Further, although in the example of this embodiment, the annular fixed section 22 is arranged around the load application section 20, it is also possible to arrange a fixed section which is not annular, but square.

Further, this embodiment was illustrated with a case wherein the hole 31 extends through to the arm 24, it is also possible to have constitution such that the hole 31 extends through the load application section 20 and the pin 32 is inserted into the hole 31. With such a configuration, displacement of the arm 24 can be controlled through control of displacement of the load application section 20 in the direction of the application of the load.

Figure 4:
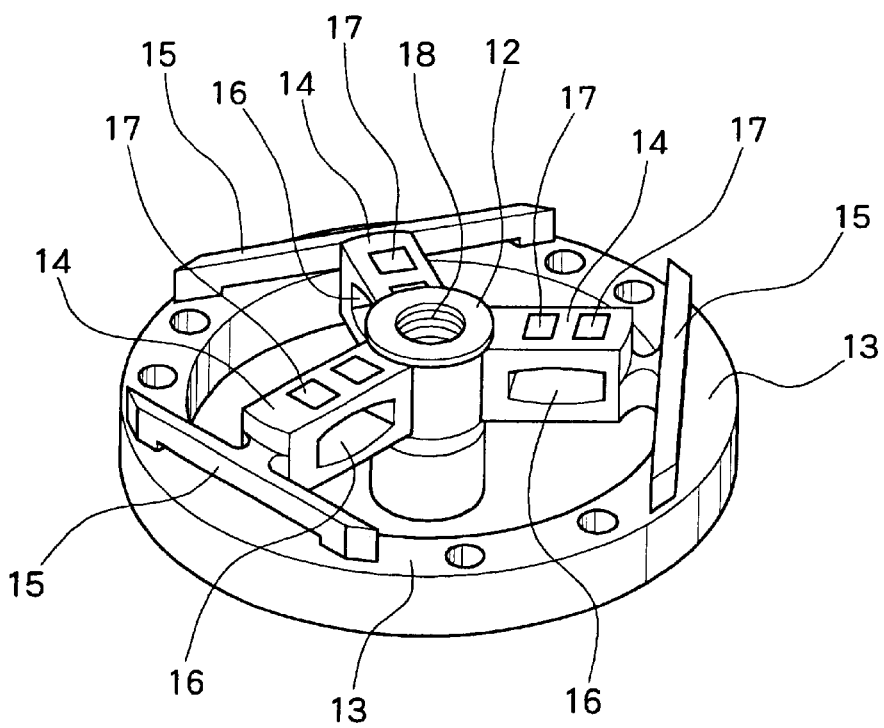
FIG. 4 is a perspective view of another conventional load cell.

Further, in this embodiment, the pin 32 is inserted into a type of load cell as shown in FIG. 1 or FIG. 2, but in terms of preventing the arm 24 from being broken, it is also possible that a hole formed through a side surface of the fixed section be provided at a type of load cell as shown in FIG. 3 or FIG. 4 and the pin 32 is inserted so as to prevent overloading of the load cell.

As explained above, according to the present invention, it is possible to obtain a load cell which is small and highly precise.

What is claimed is:

1. A load cell comprising:
    a fixed section;
    a load application section to which a load is applied;
    an arm section for connecting said fixed section with said load application section and having a distortion vulnerable section which deforms, when a load is applied to said load application section, according to said load; and
    a distortion detecting section for detecting distortion which arises in said distortion vulnerable section,
    wherein said distortion vulnerable section extends in a direction such that a phantom line along the extending direction of said distortion vulnerable section and a phantom line connecting the center of said load application section and the center of said distortion vulnerable section form a predetermined angle with respect to each other when the load cell is seen along a direction of load application.

2. The load cell according to claim 1, wherein said distortion vulnerable section includes a hole which is formed at said arm section, and said hole is formed through use of an opening in a side surface of said fixed section.

3. The load cell according to claim 2, wherein a plurality of said holes are formed along a direction of extension of said arm section.

4. The load cell according to claim 1, wherein said arm section comprises two bent arms each of which is connected to said fixed section and to said load application section.

5. The load cell according to claim 1, wherein said arm section comprises three bent arms each of which is connected to said fixed section and to said load application section.

6. The load cell according to claim 1, said load cell further comprising:
    a pin insertable into a hole formed in a side surface of said fixed section and extending substantially to said arm section or said load application section generally perpendicularly to a direction of load application.

7. The load cell according to claim 6, wherein said pin comprises a first part and a second part whose diameter is smaller than that of said first part, said first part is inserted in said fixed section, and said second part is inserted in said arm section or said load application section.

8. A load cell comprising:
    a fixed section;
    a load application section to which a load is applied;
    an arm section for connecting said fixed section with said load application section and having a distortion vulnerable section which deforms, when a load is applied to said load application section, according to said load;
    a distortion detecting section for detecting distortion of said distortion vulnerable section; and
    a pin insertable into a hole formed in a side surface of said fixed section and extending substantially to said arm section or said load application section generally perpendicularly to a direction of load application.

9. The load cell according to claim 8, wherein said pin comprises a first part and a second part whose diameter is smaller than that of said first part, said first part is inserted in said fixed section, and said second part is inserted in said arm section or said load application section.

10. A load cell comprising:
    a fixed section;
    a load application section to which a load is applied;

an arm section for connecting said fixed section with said load application section and having a distortion vulnerable section which deforms, when a load is applied to said load application section, according to said load; and a distortion detecting section for detecting distortion which arises in said distortion vulnerable section, wherein said distortion vulnerable section extends in such a manner that said distortion vulnerable section is substantially perpendicular to a straight line which connects the center of said load application section and the center of said distortion vulnerable section.

11. The load cell according to claim 10, wherein said distortion vulnerable section includes a hole which is formed at said arm section, and said hole is formed through use of an opening in a side surface of said fixed section.

12. The load cell according to claim 11, wherein a plurality of said holes are formed along a direction of extension of said arm section.

13. The load cell according to claim 10, wherein said arm section comprises two bent arms each of which is connected to said fixed section and to said load application section.

14. The load cell according to claim 10, wherein said arm section comprises three bent arms each of which is connected to said fixed section and to said load application section.

15. The load cell according to claim 10, said load cell further comprising:

a pin insertable into a hole formed in a side surface of said fixed section and extending substantially to said arm section or said load application section generally perpendicularly to a direction of load application.

16. The load cell according to claim 15, wherein said pin comprises a first part and a second part whose diameter is smaller than that of said first part, said first part is inserted in said fixed section, and said second part is inserted in said arm section or said load application section.

* * * * *

UNITED STATES PATENT AND TRADEMARK OFFICE
CERTIFICATE OF CORRECTION

PATENT NO.    : 6,711,960 B2
DATED         : March 30, 2004
INVENTOR(S)   : T. Kobayashi et al.

It is certified that error appears in the above-identified patent and that said Letters Patent is hereby corrected as shown below:

<u>Title page,</u>
Item [73], Assignee, "Teac Corporation," should read -- TEAC Corporation, --

Signed and Sealed this

Twenty-ninth Day of June, 2004

JON W. DUDAS
*Acting Director of the United States Patent and Trademark Office*